Figure 1:
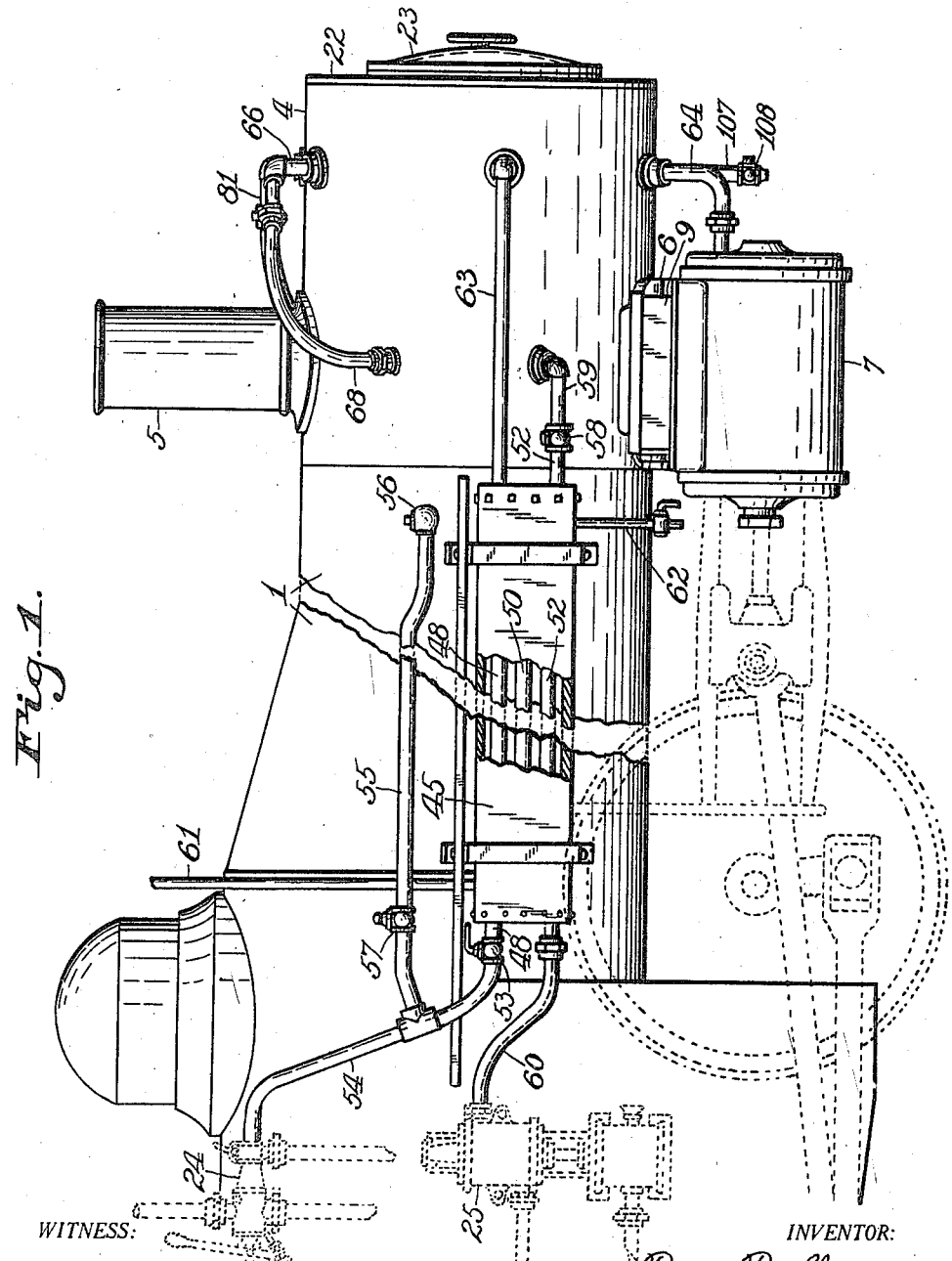

June 26, 1923.

B. R. SKINNER 1,459,901

MEANS FOR HEATING BOILER FEED WATER

Filed June 20, 1919     5 Sheets-Sheet 1

WITNESS:
D W Vorhies
F. M. Roeder

INVENTOR:
Burr R. Skinner,
BY
E. T. Silvius,
ATTORNEY.

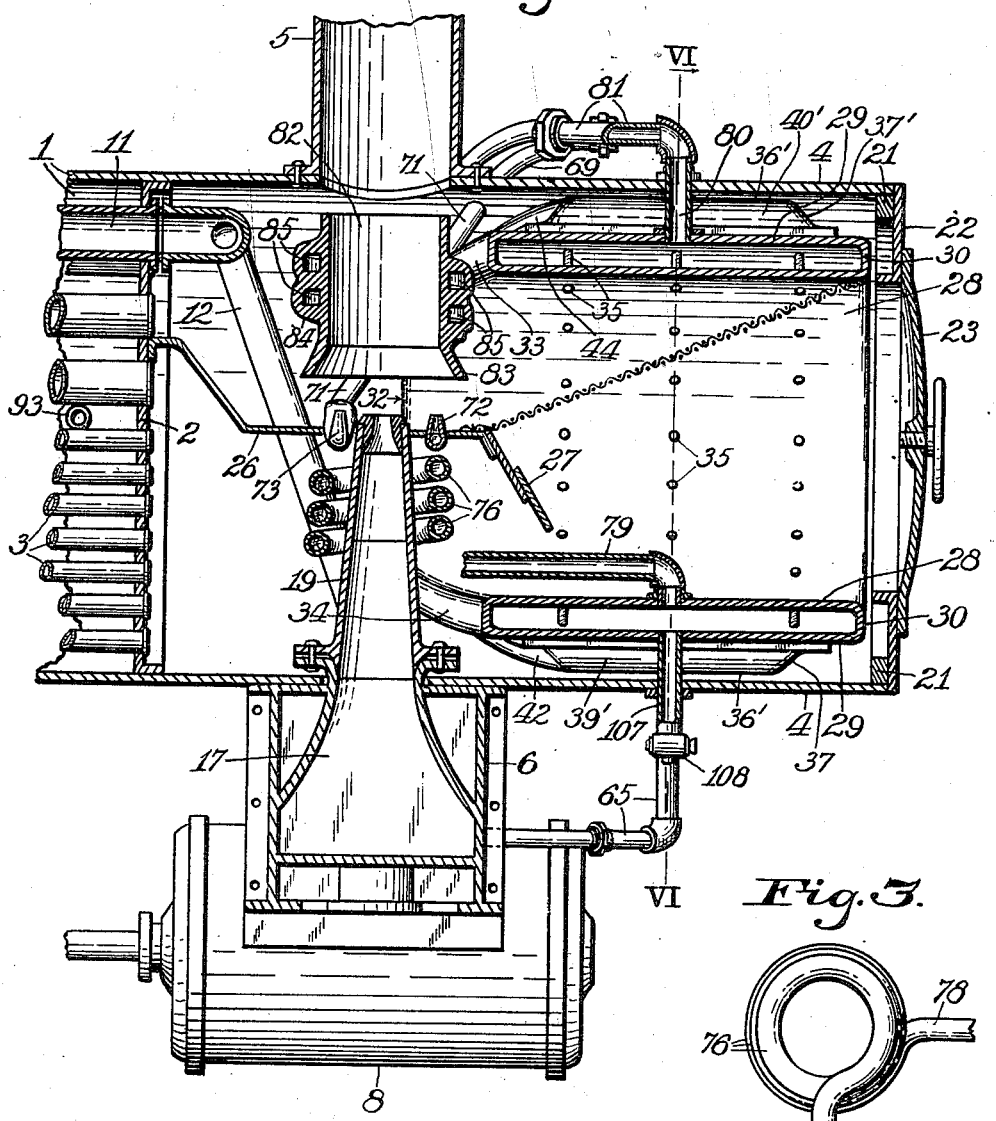

June 26, 1923.

B. R. SKINNER

MEANS FOR HEATING BOILER FEED WATER

Filed June 20, 1919    5 Sheets—Sheet 3

WITNESS:
D. W. Voorhies
F. M. Roeder.

INVENTOR:
Burr R. Skinner,
BY E. T. Silvius,
ATTORNEY.

June 26, 1923.

B. R. SKINNER

MEANS FOR HEATING BOILER FEED WATER

Filed June 20, 1919

1,459,901

5 Sheets-Sheet 4

WITNESS:
D. W. Vorhees
F. M. Roeder

INVENTOR:
Burr R. Skinner,
BY
E. T. Silvius,
ATTORNEY.

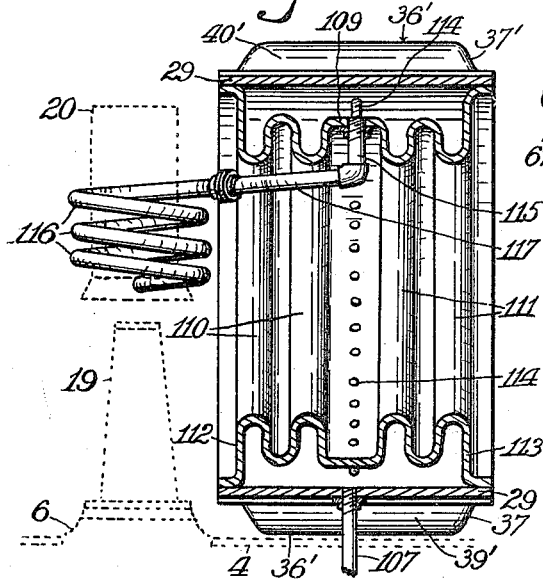

Patented June 26, 1923.

1,459,901

UNITED STATES PATENT OFFICE.

BURR R. SKINNER, OF ABERDEEN, SOUTH DAKOTA.

MEANS FOR HEATING BOILER FEED WATER.

Application filed June 20, 1919. Serial No. 305,618.

*To all whom it may concern:*

Be it known that I, BURR R. SKINNER, a citizen of the United States, residing at Aberdeen, in the county of Brown and State of South Dakota, have invented a new and useful Means for Heating Boiler Feed Water, of which the following is a specification, reference being had to the accompanying drawings, and to the letters and figures of reference marked thereon.

This invention relates to an improved system for utilizing waste heat in the operation of locomotives to raise the temperature of the water required for producing steam in the boilers of the locomotives, the invention having reference more particularly to means whereby to utilize furnace-draft heat with the heat of spent steam for heating the required water; and the invention has reference also to improvements in the apparatus described in Letters Patent granted to me on August 25, 1914, No. 1,108,633, and on May 25, 1920, No. 1,341,443.

An object of the invention is to provide means whereby the maximum benefits may be derived from furnace-draft heat in locomotives to heat the boiler feed-water before the final dissipation and waste of such heat, the primary aim being to effect the maximum economy in the consumption of fuel required to convert the water into steam.

Another object is to provide an improved system for utilizing exhaust steam and also furnace draft-heat in order that the steam-boiler may be supplied with feed-water at a high temperature and without expense for fuel, so that the water in the steam-boiler may be quickly and economically converted into steam.

A further object is to provide improved heating appliances for locomotive boilers that shall be so constructed as to be adapted to be applied thereto without requiring material change in the boiler structure, and which may be readily removed to facilitate repairs.

A still further object is to provide an improved heating boiler which shall be adapted to be removably inserted into the smoke-box of a locomotive boiler so as to not be exposed to cooling effects of the atmosphere, while having protection against damage in accidents; an aim being to provide improved heating apparatus of such construction as to be adapted to be readily applied to locomotives already in use.

With the above-mentioned and other objects in view, the invention consists in a system of improved heating appliances of novel construction and having novel features whereby boiler feed-water may be heated at different stages in its passage to a locomotive steam-boiler; and the invention consists also further in various novel features and parts, and in the novel combinations and arrangements thereof, as hereinafter particularly described and further defined in the accompanying claims.

Figure 4:
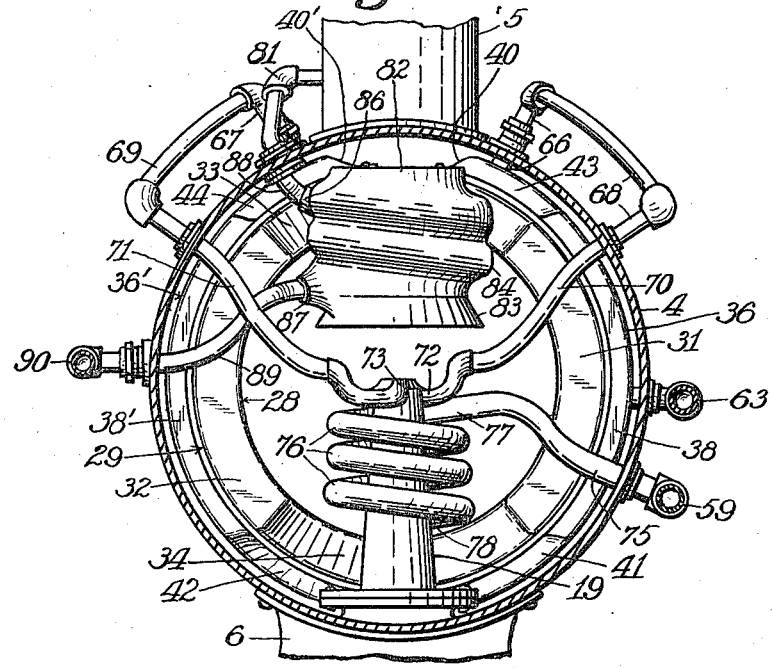
Figure 5:
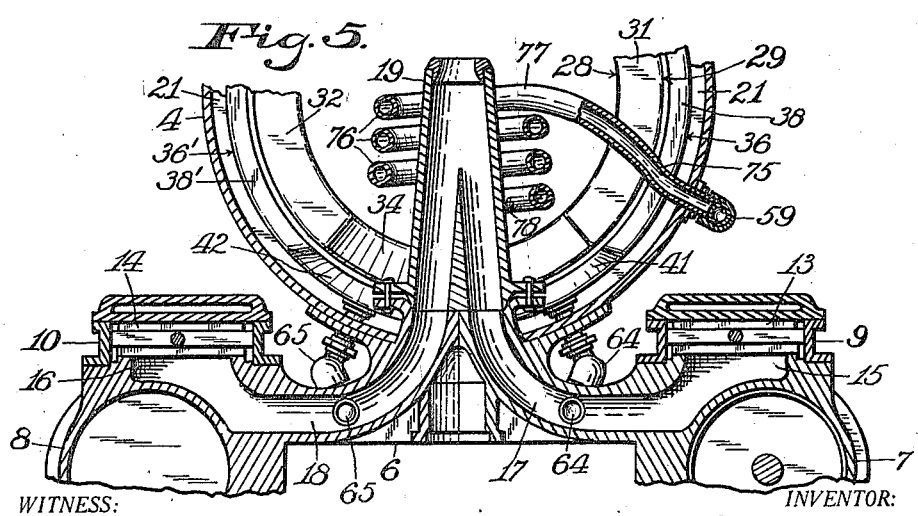
Figure 6:
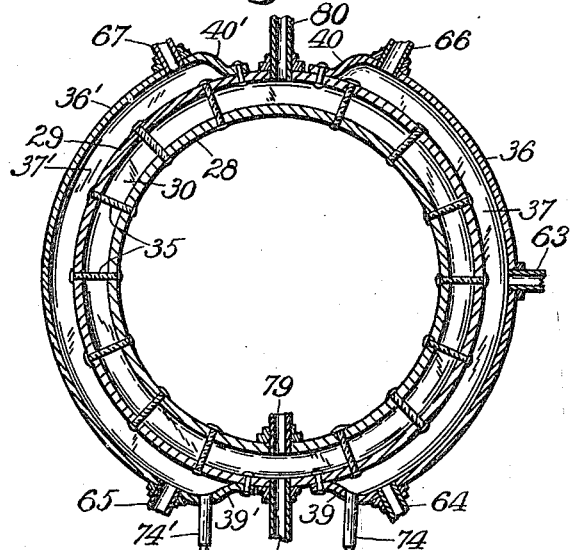
Figure 7:
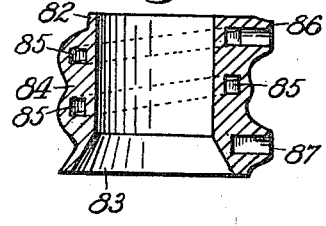
Figure 8:
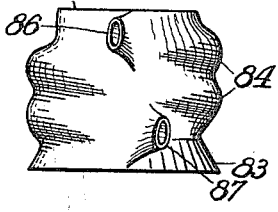
Figure 9:
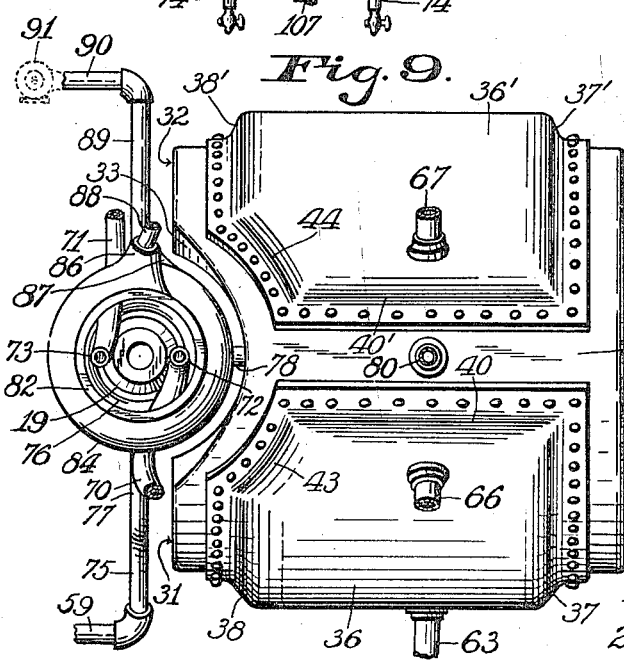
Figure 10:
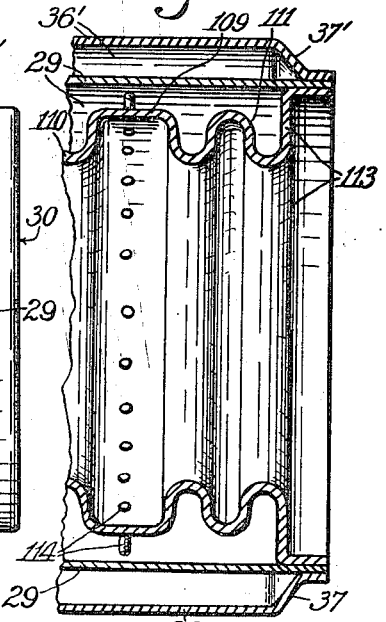

Referring to the drawings,—Figure 1 is a fragmentary right side elevation of a railway locomotive provided with the improved means for heating boiler feed-water, as preferably constructed; Fig. 2 is a longitudinal vertical sectional elevation approximately central of the forward portion of the locomotive with the invention applied thereto; Fig. 3 is a top plan of one of the improved heating appliances as preferably constructed; Fig. 4 is a transverse sectional elevation of the smoke-box and the improved heating appliances, looking forward from the rearward portion of the smoke-box; Fig. 5 is a fragmentary transverse sectional elevation taken centrally of the exhaust nozzle of the locomotive; Fig. 6 is a transverse section of the main heater comprised in the invention, taken on the line VI—VI in Fig. 2; Fig. 7 is a central section of an improved draft-pipe adapted for assisting to heat the boiler feed-water; Fig. 8 is an elevation of the improved draft pipe; Fig. 9 is a top plan of the improved heating apparatus; Fig. 10 is a fragmentary horizontal section of the main heater slightly modified; Fig. 11 is a vertical longitudinal section of the main heater in modified form and a modified heating appliance connected therewith to utilize draft-pipe heat; Fig. 12 is a fragmentary side elevation of the locomotive boiler and parts of the feed-water heating appliances connected therewith; Fig. 13 is a longitudinal sectional elevation of the primary feed-water heater comprised in the invention as preferably constructed; Fig. 14 is a transverse section of the primary feed-water heater; and Figs. 15 and 16 are sectional detail views of an improved check valve preferably employed to connect the feed-water heating system with the locomotive boiler.

Similar reference characters in the different figures of the drawings indicate corresponding elements or features of construction herein referred to in detail.

In order that the invention may be fully and clearly understood, a well known type of locomotive is briefly described and sufficiently illustrated to explain the connection of the invention therewith, the numeral 1 indicating the steam-boiler of the locomotive having a front flue sheet 2 and boiler flues or tubes 3; 4 indicating the smoke-box shell, 5 the smoke-stack, 6 the saddle secured to the bottom of the smoke-box, 7 and 8 the engine cylinders connected to the saddle and provided respectively with valve chests 9 and 10, 11 the dry pipe or steam pipe in the boiler with which branch pipes 12 are connected for conducting steam to the valve chests to be distributed to the cylinders by suitable valves 13 and 14 operating in the valve chests respectively, as will be understood. The exhaust steam is permitted by the valves to escape though exhaust ports 15 and 16 respectively into channels or cavities 17 and 18 respectively in the saddle, and thence out through a suitable exhaust pipe 19 which may be of either the single or double nozzle type. Hitherto the exhaust steam has been conducted through a "petticoat" or draft pipe 20 to the smoke-stack 5, and in the present case such action occurs but the heat of the exhaust steam as it passes through the exhaust pipe and the draft pipe is utilized to heat the feed-water without impairing the efficiency of the exhaust steam to create draft through the boiler flues. The smoke-box is of the extension-front type, the shell 4 being cylindrical and provided at its forward end with a front ring 21 to which a suitable front end member or door frame 22 is secured, the latter having a front door 23 connected thereto. The front ring 21 may be secured in place in any suitable manner permitting it to be removed for repairs as hitherto.

The boiler is supplied with water by suitable means, such as injectors, one injector 24 being indicated by broken lines; and the locomotive is provided also with a steam-operated air-pump 25 indicated by broken lines. A diaphragm 26 is arranged in the smoke-box as usual and provided with an adjustable baffle-plate 27. It will be understood that the smoke-box may be variously constructed as to details, as may also the locomotive boiler and the engine elements and various attachments.

According to the improved construction the main heater or heating boiler is constructed separately from the smoke-box and complete so as to be adapted to be inserted into or removed from the smoke-box, and in some cases is extremely long so as to extend back approximately to the exhaust pipe or nearly to the plane of the axis of the exhaust pipe. As preferably constructed the main heater comprises two concentrically arranged rings 28 and 29 connected to a front end or head 30, preferably by welding the parts together. At the opposite ends of the rings they are likewise connected to ends or heads 31 and 32 that are relatively short circumferentially so as to be arranged at opposite sides respectively of the exhaust pipe, the upper and lower portions of the rings being cut back or recessed to clear the draft pipe and the exhaust pipe respectively and being provided with curved ends or heads 33 and 34 respectively that are connected with the ends or heads 31 and 32. The space between the rings 28 and 29 constitutes a continuous annular water-chamber in which the feed-water is heated in its passage to the steam-boiler. In the preferred construction a suitable number of stay-bolts 35 are secured to the rings 28 and 29 and extend through the water-chamber. The inner ring 28 as arranged in the smoke box is exposed to the heat of the products of combustion passing through the smoke-box. The main heater is provided on the outside of the outer ring 29 of the water-chamber with a steam-chamber, or preferably as in the present case with a divided steam-chamber or practically two steam-chambers comprising a steam-jacket structure composed of two wall parts. One part of the wall of the steam-jacket comprises a curved main portion 36 formed as a segment of a cylindrical ring greater in diameter than the ring 29 and having an end portion 37, the other part comprising a curved main portion 36' having an end portion 37', the end portions extending inwardly and being secured to the outside of the ring 29. The main portions of said walls have also end portions 38 and 38' respectively that are secured to the ring 29 adjacent to the ends or heads 31 and 32 respectively. The wall portions 36 and 36' have also bottom portions 39 and 39' and top portions 40 and 40', respectively that are secured also to the ring 29 and connected to similarly secured curved portions 41 and 42 that are connected with the end portions 38 and 38' respectively, curved portions 43 and 44 extending from the upper portions of the end portions 38 and 38' to the top portions 40 and 40' respectively. In some cases the main heater may be relatively shorter and not required to be recessed to clear the exhaust pipe and the draft pipe, as will be further explained.

A primary heater is preferably included in the feed-water heating system, in order to derive the maximum benefit from exhaust steam, and it comprises a suitable shell or casing 45 which preferably is rectangular in cross section and has heads 46 and 47 so as to constitute a steam-chamber in which is a pipe coil comprising a pipe section 48 that extends through the head 46 and has a return elbow 49 connected to its inner end, a pipe section 50 connected to the elbow and having a return elbow 51 connected thereto, and a pipe section 52 connected to the elbow 51 and extending through the head 47. A stop-cock or valve 53 is connected to the pipe section 48 outside of the heater casing and a feed-pipe 54 is connected with the injector and the stop-cock or valve. A branch pipe 55 is connected with the feed-pipe 54 and also with a check valve 56 that is connected to the steam-boiler, the branch pipe being provided with a stop-cock or valve 57, so that when the stop-cock 53 is closed and the stop-cock 57 is open the feed-water may be delivered directly to the steam-boiler, which may be desired when no exhaust steam is available for heating the feed-water. The pipe section 52 is provided beyond the head 47 with a check valve 58 adapted to prevent return of the feed-water towards the injector, and a feed-pipe extension 59 is connected with the check valve 58 and may be variously connected with the water-chamber of the main heater. An exhaust pipe 60 is connected with the air pump 25 and also to the head 46 of the primary heater shell to discharge exhaust steam into the shell which has a vent pipe 61 connected thereto and has also a drain pipe 62 connected to its under portion. An exhaust pipe extension 63 is connected to the head 47 of the heater shell and is connected also with one of the steam-chambers of the main heater, and more particularly with the jacket wall 36, so that steam may pass through the pipe 63 either from or into the steam chamber of the primary heater.

The two compartments or chambers of the steam-jacket constituting portions of the main heater are separately supplied with exhaust steam when the locomotive is working, and for this purpose two pipes 64 and 65 are connected with the exhaust passages or channels 17 and 18 respectively and also with the jacket walls 36 and 36' respectively; and in order that the exhaust steam after passing through the steam-chambers may readily escape therefrom, two exhaust pipes 66 and 67 are connected to the jacket walls 36 and 36' respectively. The pipes 64 and 65 and also the pipes 66 and 67 extend through suitable openings in the shell 4 of the smoke-box which encloses the main heater. Outside the shell, branch pipes 68 and 69 are connected with the pipes 66 and 67 respectively and have extension exhaust pipes 70 and 71 connected thereto that extend into the smoke-box and towards the exhaust-pipe 19, and are provided with exhaust nozzles 72 and 73 directed upward forward and rearward respectively of the exhaust-pipe 19. The lower portions of the steam-chambers are provided with drains, preferably pipes 74 and 74' connected with the bottom portions 39 and 39' respectively, of the steam-jacket walls.

In the preferred construction the feed-water is conducted from the primary heater to an auxiliary heater coil before delivery to the main heater, and to this end a branch pipe 75 is connected with the pipe 59 outside the smoke-box shell and extends through the shell rearward of the main heater. A pipe coil 76 is arranged so as to extend spirally about the exhaust-pipe 19 and it has an inlet branch 77 at its upper portion that is connected with the branch pipe 75, so that the water shall pass downward through the coil, the coil having an outlet branch 78 at its lower portion that is connected with a conduit or pipe 79 which is connected to the lower portion of the inner ring 28 of the main heater to deliver the water into the water-chamber thereof. The uppermost portion of the ring 29 has an outlet pipe 80 connected thereto that extends upward through the adjacent portion of the smoke-box shell 4 and has a branch pipe 81 connected thereto that extends downwardly near to one side of the smoke-stack 5 and through the shell 4, as preferably constructed, suitable connections being provided to conduct the heated water thence to the steam-boiler.

For the purpose of utilizing to the utmost the heat in the smoke-box and the heat of the exhaust steam passing through the draft pipe, a novel water-heating draft pipe is provided and comprises a substantially tubular body 82 having a flaring skirt 83 on its lower end and an externally thickened wall portion 84 which is approximately spiral and has a spiral coil duct 85 therein, the walls of the duct being adapted to be heated by the exhaust steam passing through the draft pipe and also by the smoke-box heat passing outside the draft pipe to the smoke-stack, the duct having an inlet 86 at the upper portion and an outlet 87 at the lower portion of the draft pipe. A branch pipe 88 is arranged in the smoke-box and connected with the pipe 81 and the inlet 86, and another branch pipe 89 is arranged also in the smoke-box and is connected with the outlet 87 and extends through the smoke-box shell 4 and has a branch 90 connected thereto outside the smoke-box, the latter leading to a suitable check valve connected with the steam-boiler. For the purpose of the present invention the check valve comprises a body or casing 91 having a neck 92 that is connected to the pipe 90 and having also a neck 93 that is connected to the shell of the steam-boiler. The body 91 has a removable cap 94 and internally is provided with a valve seat 95 and also guide wings 96 which vertically guide a cup-valve 97 relatively to the valve seat. The valve 97 has a horizontal opening or slot 98 in its body and also a relatively narrower slot 99 extending upward from the opening. The cap 94 has screw threads 100 therein, and a valve stem 101 is arranged in the cap so as to extend therethrough and has screw threads 102 engaging the screw threads 100. The valve stem extends through the slot 99 and it has a collar 103 thereon arranged in the opening 98 in which space is afforded for movement of the collar longitudinally of the valve. The outer end of the valve stem is provided with a hand wheel 104 and the stem has a stop-pin 105 secured thereto to be stopped by the cap, or more particularly in contact with a packing nut 106 with which the cap preferably is provided. When the stop-pin is carried down to the packing nut there is sufficient space below the collar 103 in the opening 98 to permit proper lift of the valve so that it may operate as a check valve and admit the feed-water to the steam-boiler. When the valve stem is turned and moved outward the collar 103 engages the valve at the top of the opening 98 and lifts and holds the valve from its seat to permit water from the steam-boiler to pass out through the heating system to wash out sedimentary matter through a drain pipe 107 which is connected to the lowermost portion of the ring 29 and provided with a stop-cock 108.

In some cases the inner ring or wall of the water chamber of the main heater may be corrugated so as to be sufficiently strong with relatively few stay-bolts and may comprise a cylindrical middle portion 109 and corrugated portions 110 and 111 extending from the middle portion and having end wall portions 112 and 113 respectively that are secured to the outer ring 29 of the water-chamber, the water-chamber being sufficiently short to be accommodated in the smoke-box forward of the exhaust pipe 19 as approximately indicated in Fig. 11 in which the position of the exhaust pipe and an ordinary draft pipe 20 is indicated by broken lines. A suitable number of stay-bolts 114 are secured to the middle 109 of the inner ring and also to the outer ring 29. An outlet pipe 115 is connected with the uppermost portion of the inner ring portion 109 and extends downward. A pipe coil 116 is provided and arranged so as to extend about the draft pipe 20, a branch pipe 117 being connected with the upper end of the heating coil and also with the lower end of the outlet pipe 115. The lower end of the coil may be connected with the steam-boiler, as by means of the branch pipe 89 leading to the pipe 90, as above explained.

In practical use, as will be understood, the water required in the steam boiler is fed by the injector or injectors, proper space being left in the upper portion of the steam boiler to be occupied by steam under pressure. In operation the water passes through the coil in the primary heater and thence through the pipe 59 and through the pipe 75 to the upper portion of the coil 76, the water passing downward through the coil in which it is further heated by the smoke-box heat about the coil and also by the hot exhaust steam passing through the exhaust pipe 19, after the temperature of the water has been raised in the primary heater shell 45. The water passes onward from the coil 76 and into the water chamber of the main heater where it becomes further heated by the smoke-box heat on the inner ring and portions of the outer ring of the chamber and also by the steam-jacket, the water passing out through the outlet pipe 80 and thence to the draft pipe heater in which the water is further heated, the water passing at a high degree of temperature thence to the steam-boiler through the check valve. Some of the exhaust steam passes through the pipes or ducts 64 and 65 into and through the steam chambers of the water jacket and finally out through the nozzles 72 and 73 and through the draft pipe and the smoke-stack, assisting the steam from the pipe 19 to create the required fire box draft. In case the air-pump is not in operation some of the exhaust steam may pass from the steam-jacket of the main heater through the pipe 63 and into the shell 45 of the primary heater to heat the coil in the shell. When the air-pump is in operation the exhaust steam therefrom passes through the pipe 60 and into the shell 45 to heat the coil therein, the steam passing thence through the pipe 63 to the steam-jacket of the main heater.

The benefits derived from the operation of the feed-water heating system will be readily comprehended, and the value thereof in the saving of fuel for generating steam will be readily understood in connection with the description of the construction and arrangement of the many heater elements comprised in the system, without further explanation.

Having thus described the invention, what is claimed as new is—

1. A feed-water heater including two concentrically arranged rings, one end of each ring having two concavely curved portions, a head connected to the ends of the rings and having two curved portions connected to the curved portions of the rings, a head connected to the opposite ends of the rings, a feed-pipe arranged above and adjacent to the lower portion of the inner one of the rings and connected directly thereto, and two steam-jacket walls segments having top and bottom portions and also end portions secured to the outer side of the outer one of the two rings, the upper and lower portions of one end portion of each segment having concavely-curved portions corresponding to the curved head portions of the two rings.

2. In means for heating boiler feed-water, a main heater comprising a cylindrical inner wall having ends, a cylindrical outer wall surrounding the inner wall separate therefrom, two annular heads integral with the ends respectively of the walls, two steam-chamber walls opposite to opposite sides respectively of said outer wall with side portions secured to the outer wall adjacent to the opposite ends respectively thereof, the steam-chamber walls being spaced apart with tops and bottoms secured to said outer wall, and stay-bolts secured to said walls.

3. In means for heating boiler feed-water, the combination with an annular smoke-box wall, a front door mounted on the end of said wall, an exhaust pipe extending upward through the lower portion of said wall, and a draft pipe inclosed by said wall above the exhaust pipe, of a continuous annular water-heating chamber inclosed by said wall and extending approximately from said door rearward nearly to said exhaust pipe and said draft pipe, the chamber having two side portions that extend rearward nearly to opposite sides respectively of said exhaust pipe and said draft pipe, and two steam-chambers on the outer side of opposite side portions respectively of the water-heating chamber adjacent to said smoke-box wall and having each a curved recess in the lower and upper portions thereof receiving the forward portions of said pipes.

4. In means for heating boiler feed-water, the combination with an annular smoke-box wall, a front door mounted on the end of said wall, and an exhaust pipe extending upward through the lower portion of said wall, of a continuous annular water-heating chamber arranged between said door and said pipe and inclosed by said wall, said chamber being diametrically smaller than said wall, and two curved steam-chambers arranged between the smoke-box wall and opposite sides respectively of the water-heating chamber and spaced apart to afford upper and lower heat-circulating passages between them, the smoke-box wall and the outer wall of the water-heating chamber constituting walls of said passages, the outer walls of the lower portions of the steam-chambers being supported on the lower portions of the smoke-box wall.

In testimony whereof, I affix my signature in presence of two witnesses.

BURR R. SKINNER.

Witnesses:
JNO. L. RUCKMAN,
J. H. POND.